US010404096B2

(12) United States Patent
Sabnis et al.

(10) Patent No.: US 10,404,096 B2
(45) Date of Patent: Sep. 3, 2019

(54) EMERGENCY LIGHTING SYSTEM

(71) Applicant: SIGNIFY HOLDING B.V., Eindhoven (NL)

(72) Inventors: Abhishek Chandrashekhar Sabnis, Collierville, TN (US); Madan Reddy Venn, Collierville, TN (US); Shawn Croley, Memphis, TN (US)

(73) Assignee: SIGNIFY HOLDING B.V., Eindhoven (NL)

( * ) Notice: Subject to any disclaimer, the term of this patent is extended or adjusted under 35 U.S.C. 154(b) by 233 days.

(21) Appl. No.: 15/311,166

(22) PCT Filed: Apr. 28, 2015

(86) PCT No.: PCT/IB2015/053073

§ 371 (c)(1),
(2) Date: Nov. 14, 2016

(87) PCT Pub. No.: WO2015/173681

PCT Pub. Date: Nov. 19, 2015

(65) Prior Publication Data

US 2017/0093208 A1 Mar. 30, 2017

Related U.S. Application Data

(60) Provisional application No. 61/992,961, filed on May 14, 2014.

(51) Int. Cl.
*H02J 9/06* (2006.01)
*H05B 33/08* (2006.01)
(Continued)

(52) U.S. Cl.
CPC .......... *H02J 9/061* (2013.01); *H05B 33/0842* (2013.01); *H05B 33/0845* (2013.01);
(Continued)

(58) Field of Classification Search
USPC .......................................................... 307/64
See application file for complete search history.

(56) References Cited

U.S. PATENT DOCUMENTS 3,041,501 A 6/1962 Willits
4,799,039 A 1/1989 Balcom et al.
(Continued)

FOREIGN PATENT DOCUMENTS

CA 2762869 A1 6/2013
EP 0949741 A2 10/1999
(Continued)

OTHER PUBLICATIONS

Philips, Lightguard, "Smart Charger for Unit Equipment," Last Accessed on Nov. 2015 (2 Pages).

*Primary Examiner* — Rexford N Barnie
*Assistant Examiner* — Xuan Ly
(74) *Attorney, Agent, or Firm* — Akarsh P. Belagodu

(57) ABSTRACT

An emergency lighting ballast (100) includes: a power translation circuit (120) which receives input power from an emergency power source (10) and supplies output power to a load (20); a voltage monitor (130) that monitors voltage across the load and produces a voltage feedback signal; a current monitor (130) that monitors current across the load and produces a current feedback signal; a temperature sensor (160); and a programmable control device (140) which controls the power translation circuit (120) in response to either of the voltage feedback signal and the current feedback signal to cause the output power supplied to the load to have a programmed power output profile. The programmable control device also activates a self-test emergency state in response to a manual or preprogrammed request for (Continued)

a self-test, only if there is no power to the load as indicated by the voltage feedback signal and/or the current feedback signal.

15 Claims, 3 Drawing Sheets

(51) Int. Cl.
*H05B 37/02* (2006.01)
*F21Y 115/10* (2016.01)
*F21S 9/02* (2006.01)

(52) U.S. Cl.
CPC ..... *H05B 33/0884* (2013.01); *H05B 33/0887* (2013.01); *H05B 37/0227* (2013.01); *H05B 37/0272* (2013.01); *F21S 9/022* (2013.01); *F21Y 2115/10* (2016.08)

(56) References Cited

U.S. PATENT DOCUMENTS 4,945,280 A 7/1990 Beghelli
4,988,889 A 1/1991 Oughton, Jr.
5,154,504 A 10/1992 Helal et al.
5,574,423 A 11/1996 Vosika et al.
5,666,029 A 9/1997 McDonald
6,219,262 B1 4/2001 Burgyan
6,285,132 B1 * 9/2001 Conley, III ............... H02J 9/02 315/129
6,434,023 B2 8/2002 Preller
6,502,044 B1 12/2002 Lane et al.
6,538,568 B2 3/2003 Conley, III
6,788,000 B2 9/2004 Appelberg et al.
6,897,623 B2 5/2005 Yoneda et al.
7,015,654 B1 3/2006 Kuhlmann et al.
7,638,948 B2 12/2009 Descarries et al.
7,839,667 B2 11/2010 Liao et al.
8,242,757 B2 8/2012 Huang et al.
8,258,705 B2 9/2012 Butteris et al.
8,686,662 B1 1/2014 Bragg et al.
2001/0040798 A1 11/2001 Appelberg et al.
2003/0063417 A1 4/2003 Pereira et al.
2006/0139161 A1 6/2006 Beghelli
2008/0068298 A1 3/2008 Shen et al.
2008/0088254 A1 * 4/2008 Yang .................. H05B 33/0815 315/247
2011/0215728 A1 9/2011 Lenk
2013/0147351 A1 6/2013 Trainor et al.
2013/0342131 A1 12/2013 Recker et al.
2014/0001963 A1 1/2014 Chobot et al.
2014/0097758 A1 * 4/2014 Recker ............... H05B 37/0272 315/152
2014/0320011 A1 10/2014 Hegarty

FOREIGN PATENT DOCUMENTS

EP 2249458 A1 11/2010
EP 2542028 A1 1/2013
WO WO 2013090350 A1 6/2013
WO 2013111134 A1 8/2013
WO WO2013120893 A1 8/2013
WO WO2013136242 A2 9/2013

* cited by examiner

EMERGENCY LIGHTING SYSTEM

CROSS-REFERENCE TO PRIOR APPLICATIONS

This application is the U.S. National Phase application under 35 U.S.C. § 371 of International Application No. PCT/IB2015/053073, filed on Apr. 28, 2015, which claims the benefit of U.S. Patent Application No. 61/992,961, filed on May 14, 2015. These applications are hereby incorporated by reference herein.

FIELD OF THE INVENTION

The present invention is directed generally to an emergency lighting system. More particularly, various inventive methods and apparatus disclosed herein relate to an emergency lighting system with automated self-testing and reporting capabilities.

BACKGROUND

Emergency lighting has been employed for several decades, for example to provide power to one or more light sources for illumination of the path of egress from a building or facility. Emergency lighting is required in industrial, commercial, and institutional buildings as part of the safety equipment. Emergency lighting relies on a limited backup power source for example a battery, to supply power to the light source(s). An emergency lighting unit (sometimes referred to as an "emergency ballast") is designed to energize the light source(s) exclusively during periods of AC power failure when the ballast is said to be in "emergency mode" (EM), and may be combined with a conventional lighting unit (sometimes referred to as an "AC ballast"). The emergency lighting unit may sense the absence of the AC power and use the backup power source and dedicated electronic circuitry to energize the light source(s) during a limited period of AC power failure. In the USA, the required emergency lighting period is at least 90 minutes, while in Europe, e.g., it is 180 minutes, during which the emergency illumination level should not decline to under 60% of the initial level, as set for battery-powered emergency lighting systems by the life safety codes (e.g., section 7.2 of NFPA-101 and NEC 700.12).

Recently, light-emitting diodes (LEDs) have become more prominent in the market as a main light source for an occupied space. LEDs offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. These advantages are leading to the introduction of LEDs into a wide variety of applications and context. In particular, LED light sources are now being developed for use in emergency lighting systems.

Since life safety codes in the United States and Europe require that the emergency lighting unit sense the absence of AC power and use the backup power source and dedicated electronic circuitry to energize the light source(s) during a limited period of AC power failure, it becomes critical to have the ability to periodically test the status and functioning of the emergency lighting unit. In the United States, for example, NFPA-101 requires a functional test of the emergency lighting unit every 30 days for a minimum of 30 seconds, and once a year for 90 minutes. Owners must also keep written records of visual inspections and tests for inspection.

Typically, the emergency lighting is manually tested by a user, which may be an owner or employee of the facility or building walking around to every emergency lighting unit to perform the test. Alternatively, the test is performed by a technician who is hired specifically for testing. Following testing, proper records must be maintained for review and inspection. As a result, monthly and annual testing of emergency lighting unit is both time-consuming and expensive. Additionally, testing is often neglected or forgotten until an emergency state arises.

Further, although some existing emergency systems are able to perform self-testing, they rigidly perform this testing regardless of the current status of the lighting unit. The self-testing performed by these emergency systems can therefore cause a disruption if the space is occupied and the lighting unit is active.

Thus, there is a need in the art to provide an emergency lighting system that performs automated self-testing only when there is no AC power being supplied to the light sources.

SUMMARY OF THE INVENTION

The present disclosure is directed to inventive methods and apparatus for pre-programmed self-testing by an emergency ballast. Various embodiments and implementations herein are directed to emergency light sources with a voltage monitor and a current monitor that monitor voltage or current across a lighting unit, and initiate a pre-programmed self-test routine only if there is no AC power being supplied to the lighting unit. Using the various embodiments and implementations herein, efficient and cost-effective self-testing of an emergency lighting unit is performed without the need for manual input from a user, and without disturbing occupants. Further, the emergency lighting unit reports any faults or abnormalities detected during the self-test, thereby allowing for remediation of the detected issue.

Generally, in one aspect, an emergency ballast module includes: (i) a power translation circuit configured to receive input power from an emergency power source and to supply emergency output power, in response to an emergency state, to a load comprising one or more light sources; (ii) a voltage monitor configured to monitor in real time a voltage across the load and in response thereto to produce a voltage feedback signal; (iii) a current monitor configured to monitor in real time a current through the load and in response thereto to produce a current feedback signal; (iv) a temperature sensor configured to generate a temperature signal; and (v) a programmable control device; where the programmable control device is configured to control the power translation circuit in response to either of the voltage feedback signal or the current feedback signal to cause the emergency output power supplied to the load to have a programmed power output profile during the emergency state, the programmed power output profile being a function of at least the temperature signal; further where the programmable control device is further configured to activate, only if there is no power to the load as indicated by the voltage feedback signal and/or the current feedback signal, a self-test emergency state in response to a manual or preprogrammed request for a self-test, the preprogrammed request for a self-test made pursuant to a predetermined self-test schedule; and where the programmable control device is further configured to monitor one or more operating parameters of the emergency lighting ballast, and to create an alert if at least one of the one or more operating parameters falls outside a predetermined range.

According to an embodiment, the emergency lighting ballast further includes a wireless communications module configured to communicate the alert to a user.

According to an embodiment, the emergency lighting ballast includes a signal output configured to communicate the alert to a user.

According to an embodiment, the emergency lighting ballast of further includes an occupancy sensor configured to detect one or more occupants in a predetermined area, and wherein the programmable control device activates the self-test emergency state in response to a manual or preprogrammed request for a self-test only if the occupancy sensor does not detect an occupant in the predetermined area.

According to an embodiment, the programmable control device is configured to delay the self-test emergency state for at least one predetermined period of time if either of the voltage feedback signal or the current feedback signal indicate there is power to the load at the time of the request.

According to an embodiment, the programmable control device is configured to activate the self-test emergency state after the at least one predetermined period of time, even if there is power to the load.

According to an embodiment, the programmable control device includes a nonvolatile memory configured to store data about the one or more operating parameters.

According to an embodiment, the one or more operating parameters can be selected from the group consisting of connection to the load, temperature, voltage, and current, among many other parameters.

According to an embodiment, the wireless communications module is configured to detect whether an adjacent emergency lighting ballast is in a self-test emergency state.

According to an aspect is a lighting fixture including: (i) a load comprising one or more light sources; an AC ballast configured to supply power to the load; and (iii) an emergency lighting ballast having: an emergency power source; a power translation circuit configured to receive input power from the emergency power source and to supply emergency output power, in response to an emergency state, to the load; a voltage monitor configured to monitor in real time a voltage across the load and in response thereto to produce a voltage feedback signal; a current monitor configured to monitor in real time a current through the load and in response thereto to produce a current feedback signal; a temperature sensor configured to generate a temperature signal; and a programmable control device, where the programmable control device is configured to control the power translation circuit in response to the voltage feedback signal and the current feedback signal to cause the emergency output power supplied to the load to have a programmed power output profile during the emergency state, the programmed power output profile being a function of at least the temperature signal; further where the programmable control device is configured to activate, only if there is no power to the load as indicated by the voltage feedback signal and/or the current feedback signal, a self-test emergency state in response to a manual or preprogrammed request for a self-test, the preprogrammed request for a self-test made pursuant to a predetermined self-test schedule; and where the programmable control device is configured to monitor one or more operating parameters of the emergency lighting ballast, and to create an alert if at least one of the one or more operating parameters falls outside a predetermined range.

According to an embodiment, the lighting fixture further includes a signal output configured to communicate the alert to a user.

According to an embodiment, the programmable control device is configured to delay the self-test emergency state for at least one predetermined period of time if either of the voltage feedback signal or the current feedback signal indicate there is power to the load at the time of the request.

According to an embodiment, the programmable control device is configured to activate the self-test emergency state after the at least one predetermined period of time, even if there is power to the load.

According to an embodiment, the lighting fixture includes a wireless communications module configured to communicate the alert to a user.

According to an aspect is a method for controlling emergency power supplied to a load by an emergency ballast. The method includes the steps of: (i) monitoring in real time a voltage across the load and in response thereto producing a voltage feedback signal; (ii) monitoring in real time a current through the load and in response thereto producing a current feedback signal; (iii) measuring in real time a temperature of the ballast and in response thereto producing a temperature signal; (iv) controlling a power translation circuit in response to either of the voltage feedback signal or the current feedback signal to cause an emergency output power supplied to the load from an emergency power source to have a programmed power output profile during an emergency state, the programmed power output profile being a function of at least the temperature signal; (v) activating a self-test emergency state in response to a manual or preprogrammed request for a self-test, only if there is no power to the load as indicated by either of the voltage feedback signal or the current feedback signal, the preprogrammed request for a self-test made pursuant to a predetermined self-test schedule; (vi) monitoring one or more operating parameters of the emergency ballast during the emergency state; and (vii) creating an alert if at least one of the one or more operating parameters falls outside a predetermined range.

According to an embodiment, the method further includes the step of delaying the self-test emergency state for at least one predetermined period of time if either of the voltage feedback signal or the current feedback signal indicate there is power to the load at the time of the request.

According to an embodiment, the method further includes the step of activating the self-test emergency state after the at least one predetermined period of time, even if there is power to the load.

According to an embodiment, the method further includes the step of communicating the alert.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semiconductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of an emergency lighting unit pre-programmed to automatically perform a self-test and report any detected faults or conditions. More generally, Applicants have recognized and appreciated that it would be beneficial to provide an emergency lighting that that monitors voltage and/or current to a lighting unit and initiates a pre-programmed self-test routine only if there is no AC power being supplied. A particular goal of utilization of certain embodiments of the present disclosure is the automated performance of self-testing and reporting without the need for manual input from a user, and without disturbing occupants.

In view of the foregoing, various embodiments and implementations are directed to an emergency lighting unit with a voltage monitor and a current monitor that monitor voltage or current across a lighting unit. A self-test is performed in response to a pre-programmed schedule only if there is currently no voltage or current being supplied to the lighting unit.

Figure 1:
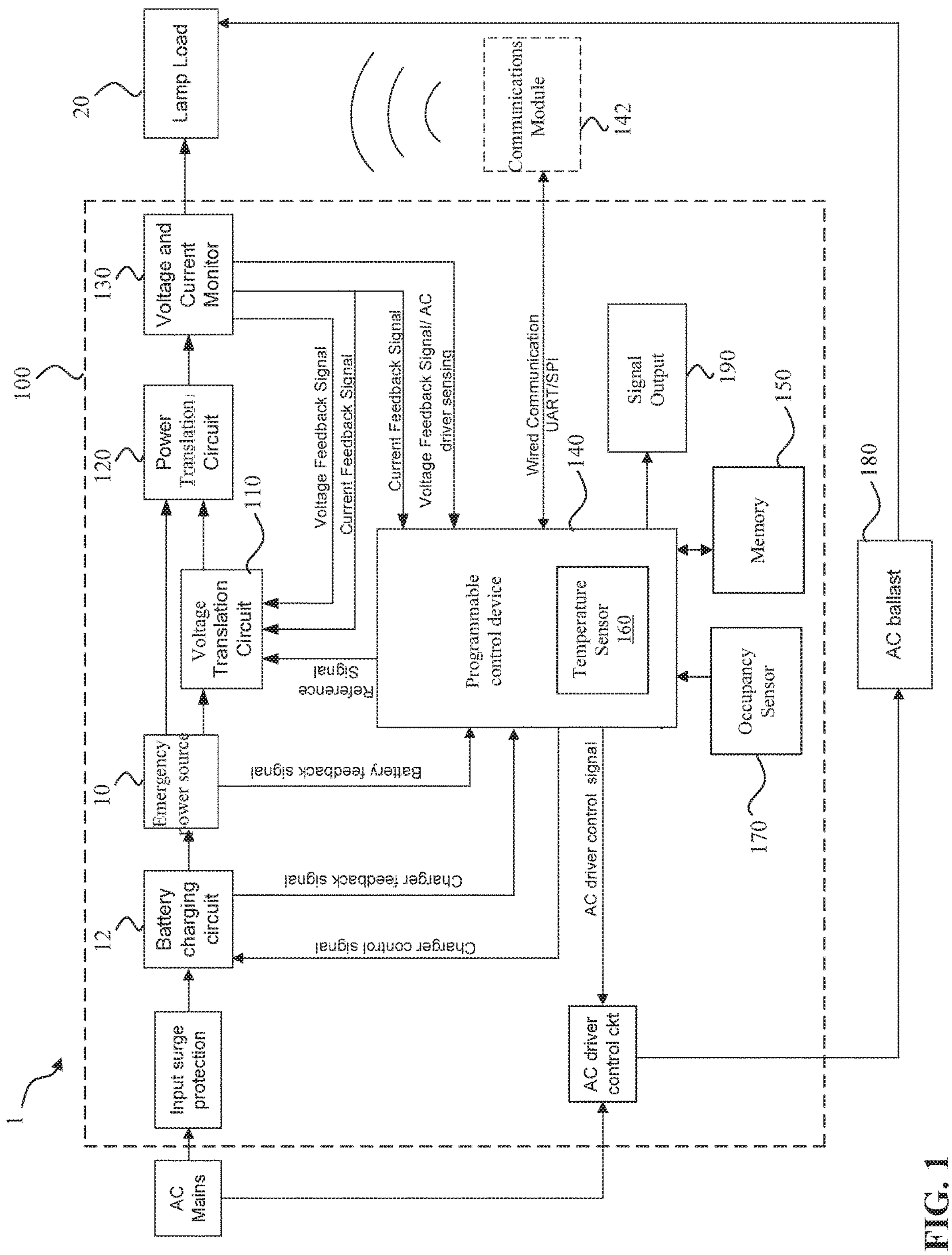
FIG. 1 is a schematic representation of an emergency lighting unit in accordance with an embodiment.

Referring to FIG. 1, in one embodiment, a schematic of an emergency lighting system 1 is provided. Emergency lighting system 1 comprises an emergency ballast 100 which receives emergency input power from an emergency power source 10 (e.g., one or more batteries), and supplies output power to a power controlled load 20. In some embodiments, power controlled load 20 may comprise one or more light sources. In some embodiments, the one or more light sources may comprise one or more light emitting diodes (LEDs).

Emergency ballast 100 comprises a voltage translation circuit 110, a power translation circuit 120, a voltage and current monitor 130, and a programmable control device 140. In some embodiments, power translation circuit 120 comprises a pulse-width modulation (PWM) DC-to-DC converter which supplies a controlled output current to power controlled load 20. However, other embodiments may employ other types of power translation circuits and methods besides PWM. Voltage and current monitor 130 includes a voltage monitor configured to monitor in real time the voltage across power controlled load 20, and in response thereto to produce a voltage feedback signal, and a current monitor configured to monitor in real time the current being supplied to power controlled load 20, and in response thereto to produce a current feedback signal.

In some embodiments, voltage translation circuit 110 comprises a PWM controller for controlling a duty cycle of a PWM modulator of power translation circuit 120 in response to a reference signal from programmable control device 140 and the voltage feedback signal and/or current feedback signal from voltage and current monitor 130. However, other embodiments may employ other types of power translation circuits and methods besides PWM.

In some embodiments, programmable control device 140 may include a processor, in particular a microprocessor. In some embodiments, emergency ballast 100 may include one or more memory devices 150 which are accessible by a processor in programmable control device 140 and which store(s) data which identifies a programmed power output profile which is to be supplied by power translation circuit 120 to power controlled load 20. In some embodiments, memory device(s) 150 may store data indicating a programmed power output profile for the output power which is to be supplied by power translation circuit 120 to power controlled load 20 which is a function of one or more parameters, such as time, temperature, the type of energy source employed for emergency power source 10, the amount of remaining energy stored in emergency power source 10, and/or the occupancy of an area in which emergency ballast 100 (or power controlled load 20, e.g., including one or more lighting sources) is located. In some embodiments, memory device(s) 150 may store data indicating one or more programmed self-test routines. In some embodiments, memory device(s) 150 may include volatile memory and non-volatile memory. The non-volatile memory may store instructions to be executed by a processor of programmable control device 140 to, for example, transform the voltage feedback and current feedback signals to the reference signal to achieve the expected output power to match the desired power output profile. As another example, the non-volatile memory may store instructions to be executed by a processor of programmable control device 140 to execute one or more self-test protocols or routines.

Emergency Power Control

During normal operation, AC power is supplied to both the emergency ballast 100 and to the AC ballast 180. From the AC ballast 180, the AC power is supplied directly to the load 20. The AC power supplied to the emergency ballast 100 is also supplied to the load 20 after at least the battery charging circuit 12, the power translation circuit 120, and the voltage and current monitor 130.

Programmable control device 140 is programmed, configured, or designed to detect AC power failure when emergency lighting system 1 is in EM, and energize load 20 including one or more light sources for a predetermined minimum amount of time during the AC power failure. For example, in the United States the minimum amount of time is 90 minutes and in Europe it is 180 minutes.

To detect and respond to an AC power failure, programmable control device 140 monitors the AC power supplied to the load 20 via the voltage feedback signal and the current feedback signal. During an emergency state, no AC power is supplied to the load 20, and there will be no voltage feedback signal or current feedback signal. The programmable control device 140 then directs the power translation circuit 120 to power controlled load 20 with a power output from the emergency power source 10 according to a pre-programmed power output profile. Programmable control device 140 can monitor the output power provided by power translation circuit 120 to power controlled load 20 via the voltage feedback signal and the current feedback signal. Programmable control device 140 can also adjust the output power provided by power translation circuit 120 to power controlled load 20 via a reference signal supplied to voltage translation circuit 110 so as to cause the output power provided by power translation circuit 120 to power controlled load 20 to match the pre-programmed output power profile. For example, the current feedback signal can serve as the reference value for programmable control device 140, so as to precisely control the output power supplied by power translation circuit 120 to power controlled load 20 to match a programmed output power level.

For example, in some embodiments, programmable control device 140 receives the voltage feedback signal from voltage and current monitor 130 and calculates therefrom an expected current value which would deliver the programmed output power level to power controlled load 20. In that case, programmable control device 140 also receives the current feedback signal from voltage and current monitor 130. Programmable control device 140 compares the expected current value to the current value indicated by the current feedback signal, and in response thereto outputs to power translation circuit 120 a reference signal which indicates whether the output power level should be adjusted, for example by adjusting a duty cycle of a pulse width modulator of power translation circuit 120.

In some embodiments, the programmed output power level which is to be supplied by power translation circuit 120 to power controlled load 20 during an emergency state is a value which changes with time. In some embodiments the power output profile may correspond to a series of constant power steps, each corresponding to a particular output power level. However, in general any arbitrary power output profile may be employed within the constraints of the amount of energy available from emergency power source 10.

If the programmed output power is constant, then programmable control device 140 provides a reference signal which is substantially constant. If the output power is to be adjusted, then programmable control device 140 provides a reference signal which is adjusted to thereby cause voltage translation circuit 110 and power translation circuit 120 to adjust the output power supplied to power controlled load 20.

When the voltage or current feedback signal is not available or within a specified range (for example, due to a load having too high or too low of an impedance), emergency ballast 100 may self-limit to prevent high potentials on open loads, or high currents on low impedance loads. For example, in some embodiments when improper or out of range feedback signals are detected, programmable control device 140 operates together with voltage translation circuit 110 to cause power translation circuit 120 to reduce the output power to minimum programmed levels until appropriate loads are detected.

For example, in emergency ballast 100, the voltage and current reference signals are also supplied to voltage translation circuit 110. This may facilitate the ability of voltage translation circuit 110 to protect power translation circuit 120 against over-voltage or over-current conditions. Voltage translation circuit 110 may be set with inherent limits to protect against improper loading. In that case, when the impedance of power controlled load 20 is detected to be less than a lowest specified impedance, programmable control device 140 may operate with voltage translation circuit 110 to limit the output current from power translation circuit 120 to a set maximum value. When the impedance of power controlled load 20 is reduced to near zero, programmable control device 140 may reduce the output current from power translation circuit 120 to a minimum programmed operational output. Conversely, when the impedance of power controlled load 20 is detected to be greater than a maximum specified impedance, programmable control device 140 may operate with voltage translation circuit 110 to limit the output voltage from power translation circuit 120 to a set maximum value.

As indicated above, in some embodiments, emergency ballast 100 may be programmed to provide a power output profile for the output power which is to be supplied by power translation circuit 120 to power controlled load 20 which is a function of one or more parameters, such as time, temperature, the type of energy source employed for emergency power source 10, the amount of remaining energy stored in emergency power source 10, and the occupancy of an area in which emergency ballast 100 (or power controlled load 20) is located.

Toward that end, as shown in FIG. 1, in some embodiments emergency ballast 100 may include one or more temperature sensors 160 and/or occupancy sensors 170. Furthermore, in some embodiments emergency power source 10 may provide one or more signals to programmable control device 140 as illustrated in FIG. 1 and described below. It should be understood that in other embodiments, occupancy sensor(s) 170 may be omitted from emergency ballast 100. In other embodiments, emergency ballast 100 may receive one or more signals from one or more temperature sensor(s) and/or occupancy sensor(s) which are external to emergency ballast 100, and process those signals in the same or similar way to the way it processes signals from temperature sensor(s) 160 and/or occupancy sensor(s) 170, as discussed below. Indeed, in general it should be understood that, for convenience of illustration, a dashed box is shown enclosing components of the particular embodiment of emergency ballast 100 illustrated in FIG. 1, in other embodiments of a power control apparatus one or more of the specific components shown in the dashed box may be provided external to the power control apparatus, or may be omitted.

In some embodiments, programmable control device 140 receives a temperature reference value from temperature sensor 160 and transforms the expected reference signal based on the programmed power. That is, based on the temperature reference value received from temperature sensor 160, programmable control device 140 may modify the reference signal which it provides to voltage translation circuit 110 to cause power translation circuit 120 to reduce, raise, or not change the output power which it supplies to load 20. For example, if the temperature is above a predetermined limit, programmable control device 140 can reduce the output power to reduce the stress on the system as a whole. Also, programmable control device 140 can adjust the output power supplied to load 20 based on the rate of change of temperature.

In some embodiments, programmable control device 140 may receive an occupancy reference value from occupancy sensor 170 which may depend on whether or not a particular area or room, for example an area or room where load 20 (e.g., one or more lighting devices) is located, and transforms the expected reference signal based on the programmed power profile. That is, based on the occupancy reference value from occupancy sensor 170, programmable control device 140 may modify the reference signal which it supplies to voltage translation circuit 110 to cause power translation circuit 120 to reduce, raise, or not change the output power which it supplies to load 20. For example, if an area needed to be lit by one or more lighting devices of load 20 in an emergency situation is not occupied by anyone, then programmable control device 140 can reduce the output power supplied to 20 to conserve the energy stored in emergency power source 10 until the area is occupied.

In some embodiments, programmable control device 140 may receive one or more signals from emergency power source 10 that describe(s) the emergency power source type and amount of energy available. If the available energy remaining is low, then programmable control device 140 may modify the reference signal which it supplies to voltage translation circuit 110 to cause power translation circuit 120 to reduce the output power to the load. Thus emergency ballast 100 can either follow a predetermined power profile or dynamically adjust the output power profile over time. This can in effect conserve energy from emergency power source 10 and thus extend operation during an emergency state.

Accordingly, emergency lighting system 1 is programmable to control the output power in response to a voltage feedback signal and a current feedback signal in order to cause the output power supplied to load 20 to have a programmable power output profile, for example as a function of time. In some embodiments, the power output profile may be characterized by a finite number of constant power steps each having a corresponding time duration. In some embodiments, the first constant power step at a time when the emergency lighting system 1 is initially activated to provide emergency lighting (e.g., in response to a loss of AC Mains power) may have a first power level, and a last step at a specified time interval (e.g., 60 minutes or 90 minutes) after the emergency lighting driver is initially activated has a second power level which is less than the first power level and greater than zero. In some embodiments, the second power level may be a specified percentage of the initial power level of the first step, which may be set to meet regulatory requirements for emergency lighting in a particular jurisdiction. For example, in the United States the current requirement is for emergency lighting system 1 to provide at least 60% of the initial lighting level for a required minimum emergency lighting period of at least 90 minutes. In Europe, the required minimum emergency lighting period is 180 minutes.

Automated Self-Testing

Life safety codes in the United States mandate regular testing and maintenance of emergency lighting systems. For example, NFPA-101 requires a functional test of the emergency lighting system every 30 days for a minimum of 30 seconds, and once a year for 90 minutes. Accordingly, emergency lighting system 1 is configured for testing of the functionality of the system during an emergency state that is activated in the absence of an emergency.

Figure 2:
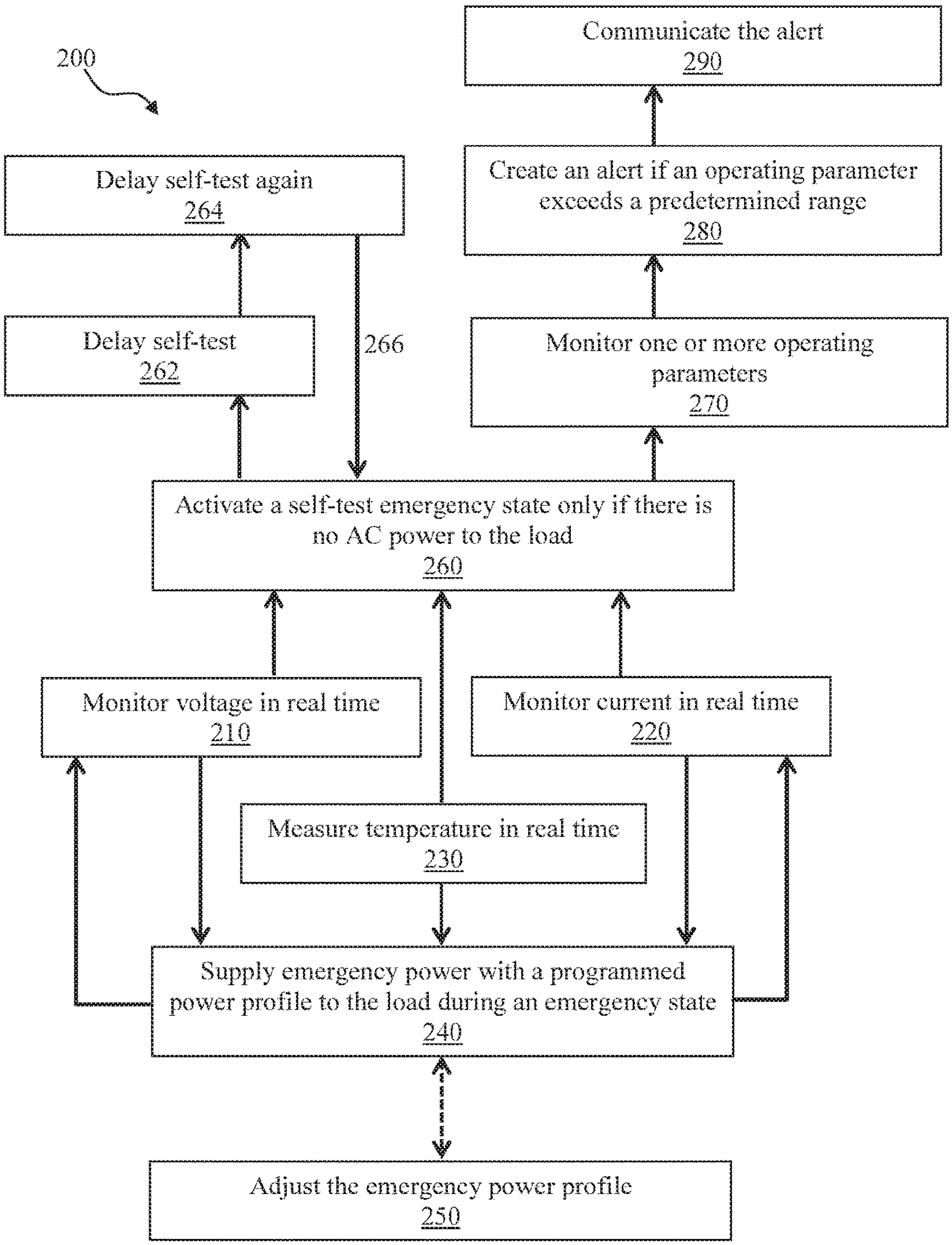
FIG. 2 is a flow chart of a method for providing emergency lighting in accordance with an embodiment.

Referring to FIG. 2 is a flowchart of a method 200 for automated self-testing by emergency lighting system 1 in accordance with an embodiment. Emergency lighting system 1 is any of the emergency lighting systems described or otherwise envisioned herein. For example, emergency lighting system 1 includes an emergency ballast 100 which receives emergency input power from an emergency power source 10 (e.g., one or more batteries), and supplies output power to a power controlled load 20, such as one or more LED light sources. The emergency lighting system can further include a voltage translation circuit 110, a power translation circuit 120, a voltage and current monitor 130, and a programmable control device 140. During the detected emergency state, the emergency lighting system receives input power from emergency power source 10 and supplies emergency output power from that source to a load 20 comprising one or more light sources.

At step 210 of the method, the emergency lighting system monitors the voltage across the load 20 in real time, and at step 220 the emergency lighting system monitors the current across the load 20 in real time. Voltage and current monitor 130 of emergency lighting system 1 includes a voltage monitor configured to monitor in real time the voltage across power controlled load 20, and in response thereto to produce a voltage feedback signal, and a current monitor configured to monitor in real time the current being supplied to power controlled load 20, and in response thereto to produce a current feedback signal. The voltage feedback signal and the current feedback signal are provided to the programmable control device 140.

At step 230 of the method, the system monitors a temperature of the emergency lighting system in real time. Emergency ballast 100 may include one or more temperature sensors 160 as illustrated in FIG. 1. According to a preferred embodiment, programmable control device 140 comprises a temperature sensor. At step 230, programmable control device 140 receives a temperature signal from temperature sensor 160.

At step 240 of the method, the programmable control device 140 determines that an emergency state exists. During an emergency state, no AC power is supplied to the load 20, and there will be no voltage feedback signal or current feedback signal. The programmable control device 140 then directs the power translation circuit 120 to power controlled load 20 with a power output from the emergency power source 10 according to a pre-programmed power output profile. Programmable control device 140 can monitor the output power provided by power translation circuit 120 to power controlled load 20 via the voltage feedback signal and the current feedback signal.

At optional step 250 of the method, programmable control device 140 adjusts the output power provided by power translation circuit 120 to power controlled load 20 via a reference signal supplied to voltage translation circuit 110 so as to cause the output power provided by power translation circuit 120 to power controlled load 20 to match the pre-programmed output power profile. For example, the current feedback signal can serve as the reference value for programmable control device 140, so as to precisely control the output power supplied by power translation circuit 120 to power controlled load 20 to match a programmed output power level. For example, the power output profile can be adjusted by the programmable control device 140 depending on a variety of factors including time, occupancy, remaining emergency power supply, and other factors.

According to an embodiment, for example, the programmed power output profile is a function of at least the temperature signal received from the temperature sensor 160. For example, programmable control device 140 can receive a temperature reference value from temperature sensor 160 and transform the expected reference signal based on the programmed power. That is, based on the temperature reference value received from temperature sensor 160, programmable control device 140 may modify the reference signal which it provides to voltage translation circuit 110 to cause power translation circuit 120 to reduce, raise, or not change the output power which it supplies to load 20. For example, if the temperature is above a predetermined limit, programmable control device 140 can reduce the output power to reduce the stress on the system as a whole. Also, programmable control device 140 can adjust the output power supplied to load 20 based on the rate of change of temperature.

According to another embodiment, for example, programmable control device 140 may receive an occupancy reference value from occupancy sensor 170 which may depend on whether or not a particular area or room, for example an area or room where load 20 (e.g., one or more lighting devices) is located, and transforms the expected reference signal based on the programmed power profile. That is, based on the occupancy reference value from occupancy sensor 170, programmable control device 140 may modify the reference signal which it supplies to voltage translation circuit 110 to cause power translation circuit 120 to reduce, raise, or not change the output power which it supplies to load 20. For example, if an area needed to be lit by one or more lighting devices of load 20 in an emergency situation is not occupied by anyone, then programmable control device 140 can reduce the output power supplied to 20 to conserve the energy stored in emergency power source 10 until the area is occupied.

At step 260 of the method, the emergency lighting system 1 activates an emergency state in the absence of an emergency in order to perform a self-test. Programmable control device 140 is programmed, configured, or designed to periodically perform a self-test of the system pursuant to a demand from a predetermined self-test schedule. For example, the programmable control device 140 can be programmed or configured to satisfy local, state, and/or federal laws and regulations regarding the maintenance and testing of emergency lighting. In the United States, for example, regulations require a functional test of an emergency lighting unit every 30 days for a minimum of 30 seconds, and once a year for 90 minutes. According to an embodiment, the emergency lighting system 1 can be programmed or configured to simulate an emergency state more frequently than the required minimum. A demand to activate an emergency state is made pursuant to a predetermined self-test schedule, but the emergency lighting system 1 will only activate the emergency state if the AC ballast is not concurrently providing power to the load 20 as determined by the voltage feedback signal or current feedback signal provided to the programmable control device 140.

At step 270 of the method, the programmable control device 140 monitors one or more operating parameters of emergency lighting system 1 during the emergency state. Operating parameters can include temperature, emergency power voltage, emergency power current, load characteristics, and a variety of other operating parameters. These operating parameters are optionally recorded in memory. For example, programmable control device 140 can monitor the output power profile over the course of the self-test in order to evaluate the functionality of the emergency power source.

According to an embodiment the measured operating parameters are compared to a predetermined range, threshold, or value. At step 280 of the method, an alert is created by the system if one or more operating parameters exceeds a predetermined range or threshold, or does not match a predetermined value. At step 290, the alert can be communicated to a user or a computer. For example, the emergency lighting system 1 can comprise a signal output 190 which physically reports the alert to the user. Examples of a signal output include a light source, a noise circuit for creating an audible sound, and a variety of other reporters. As just one example, a light source can report an alert using color, with green indicating a successful self-test and red indicating an alert. The light source can also report an alert using flashes of light, with the number, frequency, or pattern of flashes communicating the nature of the alert.

According to another embodiment, emergency lighting system 1 can comprise a wired or wireless communications module 142 configured to communicate the alert. A wired communications module 142 may communicate the alert to a central server, computer, controller, or other central location. A wireless communications module 142 may communicate the alert to a central server, computer, controller, or other central location, as well as to a variety of other devices with a wireless communications module such as a mobile device, smartphone, PDA, other emergency lighting system, or similar device. Examples of a wireless communications format include Wi-Fi, ZigBee, Bluetooth, and others.

Figure 3:
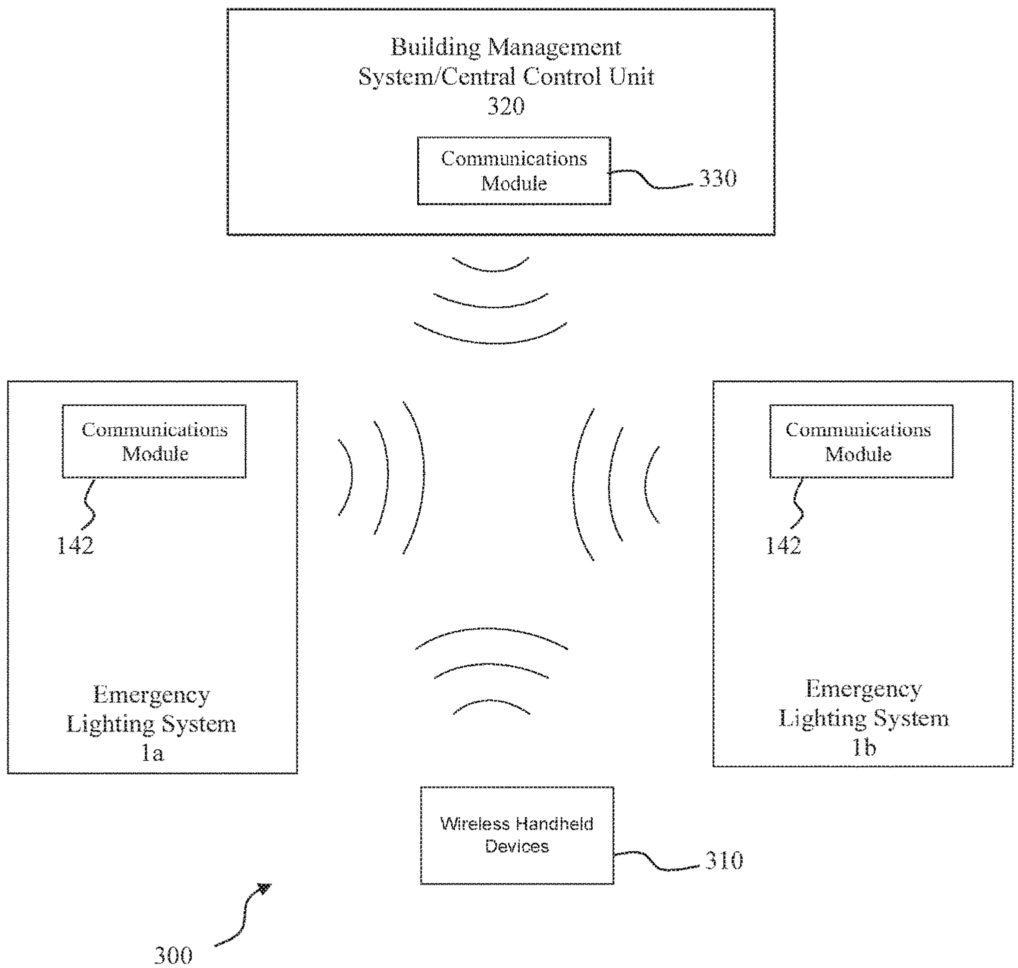
FIG. 3 is a schematic representation of a network of emergency lighting systems in accordance with an embodiment.

Referring to FIG. 3 is a schematic of a network 300 of emergency lighting systems in accordance with an embodiment. The network consists of a plurality of emergency lighting systems, in this instance emergency lighting system 1*a* and emergency lighting system 1*b*. Each emergency lighting system includes a wireless communications module 142 configured to wirelessly communicate with a central server, computer, controller, or other central location, and/or with a wireless handheld device 310 with a wireless communications module such as a mobile device, smartphone, PDA, other emergency lighting system, or similar device. According to an embodiment, the network 300 of emergency lighting systems can receive and/or communicate a demand for a self-test according to a manual request or to a demand created by a pre-programmed self-test schedule. For example, a primary emergency lighting system in the network may be programmed to communicate a demand for a self-test to other emergency lighting systems in the network when it receives a manual request or when it determines a self-test is mandated by a predetermined schedule. Alternatively, a central server, computer, controller, or other central location may communicate a demand for a self-test to one or more emergency lighting systems in the network when it receives a manual request or when it determines a self-test is mandated by a predetermined schedule. A manual demand for a self-test may come from, for example, wireless handheld device 310 as a user navigates through a space. This allows the user to directly observe the test. According to another embodiment, the network 300 of emergency lighting systems can receive and/or communicate the results of the self-test, including any detected faults, alerts, or other reports. The results can be communicated to a central server, computer, controller, or other central location, to other emergency lighting systems in the network, and/or to the wireless handheld device 310.

According to one embodiment of a network 300 of emergency lighting systems 100, one or more of the lighting systems can be configured to detect when an adjacent emergency lighting ballast is in a self-test emergency state, which prevents neighboring emergency lighting systems from concurrently running a self-test. For example, the programmable control device 140 can be configured or programmed to direct the communications module 142 to communicate to one or more neighboring or adjacent—where neighboring or adjacent could mean those within a predetermined distance, those within the same room, those within the same building, or other ranges—that it is currently running a self-test. Further, the communications module can communicate to the one or more neighboring or adjacent the type of self-test it is running, the expected run time, and a variety of other information about itself and the self-test.

According to another embodiment of a network 300 of emergency lighting systems 100, one or more of the lighting systems can be configured to communicate, via communications module 142, with a central server, computer, controller, or other device or location within a building management system 320. For example, the building management system can be configured, designed, or programmed to maintain a self-test schedule and send self-test demands to the one or more emergency lighting systems, and can communicate through a communications module 330. Building management system 320 can also be configured to collect, aggregate, and/or report operating parameters and alerts detected during one or more self-tests.

Delayed Self-Testing

According to an embodiment, the emergency lighting system 1 will only activate an emergency state for self-testing if the AC ballast is not concurrently providing power to the load 20 as determined by the voltage feedback signal and/or current feedback signal provided to the programmable control device 140. Accordingly, the emergency lighting system 1 must be programmed or configured to respond to a demand to activate a self-testing emergency state that is made when the AC ballast is providing power to the load 20.

At step 262 of the method depicted in FIG. 2, the programmable control device 140 determines via the voltage feedback signal and/or current feedback signal that AC ballast is providing power to the load 20, and delays the self-test for a predetermined period of time. For example, the programmable control device 140 can delay the self-test for a period of eight hours, at which time it can again detect via the voltage feedback signal and/or current feedback signal whether the AC ballast is providing power to the load 20. If the AC ballast is indeed providing power to the load 20 after the expiration of the first predetermined period of time, at step 264 of the method the programmable control device delays the self-test for a second period of time. The amount of the second period of time can be exactly the same as the amount of the previous predetermined period of time, or the system can be programmed with a schedule or logic to change the duration of the second period of time in order to maximize the chance that the load will not be drawing power from the AC ballast at the end of the second period of time. Step 264 of the method can be repeated several times, with each new period of time being exactly the same or being varied.

Finally, at step 266 of the method, the emergency lighting system 1 activates a self-testing emergency state, following a predetermined number of time periods, regardless of whether the AC ballast is providing power to the load 20. According to an embodiment, the predetermined number of time periods is just the first predetermined period of time, or it can be multiple consecutive time periods. This prevents the self-test from being delayed indefinitely, such as in cases where the load 20 is always supplied power from the AC ballast.

As just one example, the system can be programmed to delay the self-test for a period of eight (8) hours following a demand that is made while the AC ballast is providing power to the load 20. The system can then delay the self-test demand for a series of consecutive eight-hour time periods, for a total of 72 hours. After the nine eight-hour time periods, or 72 hours, the emergency lighting system 1 activate a self-testing emergency state regardless of whether the AC ballast is providing power to the load 20. Many other time periods are possible. For example, the individual delay periods can be 1 hour, 4 hours, or many other time periods, and the total delay period could be 24 hours, 48 hours, a week, or many other total time periods.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An emergency lighting ballast comprising:

a power translation circuit configured to receive input power from an emergency power source and to supply emergency output power, in response to an emergency state, to a load comprising one or more light sources;

a voltage monitor configured to monitor in real time a voltage across the load and in response thereto to produce a voltage feedback signal;

a current monitor configured to monitor in real time a current through the load and in response thereto to produce a current feedback signal;

a temperature sensor configured to generate a temperature signal; and a programmable control device;

wherein the programmable control device is configured to control the power translation circuit in response to at least one of the voltage feedback signal or the current feedback signal to cause the emergency output power supplied to the load to have a programmed power output profile during the emergency state, wherein the programmed power output profile is a function of at least the temperature signal;

wherein the programmable control device is further configured to activate, if there is no power to the load as indicated by the voltage feedback signal and/or the current feedback signal, a self-test emergency state in response to a manual or preprogrammed request for a self-test, wherein the preprogrammed request for a self-test is made pursuant to a predetermined self-test schedule; and wherein the programmable control device is further configured to monitor one or more operating parameters of the emergency lighting ballast, and to create an alert if at least one of the one or more operating parameters falls outside a predetermined range.

2. The emergency lighting ballast of claim 1, further comprising a wireless communications module, the wireless communications module configured to communicate the alert to a user or to a building management system.

3. The emergency lighting ballast of claim 2, wherein the wireless communications module is configured to detect whether an adjacent emergency lighting ballast is in a self-test emergency state.

4. The emergency lighting ballast of claim 1, further comprising a signal output , the signal output configured to communicate the alert to a user.

5. The emergency lighting ballast of claim 1, further comprising an occupancy sensor configured to detect one or more occupants in a predetermined area, and wherein the programmable control device activates the self-test emergency state in response to a manual or preprogrammed request for a self-test if the occupancy sensor does not detect an occupant in the predetermined area.

6. The emergency lighting ballast of claim 1, wherein the programmable control device is further configured to delay the self-test emergency state for at least one predetermined period of time if at least one of the voltage feedback signal or the current feedback signal indicates there is power to the load at the time of the request.

7. The emergency lighting ballast of claim 6, wherein the programmable control device is further configured to activate the self-test emergency state after the at least one predetermined period of time, even if there is power to the load.

8. A lighting fixture, comprising:

a load comprising one or more light sources;

an AC ballast configured to supply power to the load; and an emergency lighting ballast comprising:

an emergency power source;

a power translation circuit configured to receive input power from the emergency power source and to supply emergency output power, in response to an emergency state, to the load;

a voltage monitor configured to monitor in real time a voltage across the load and in response thereto to produce a voltage feedback signal;

a current monitor configured to monitor in real time a current through the load and in response thereto to produce a current feedback signal;

a temperature sensor configured to generate a temperature signal; and a programmable control device;

wherein the programmable control device is configured to control the power translation circuit in response to the voltage feedback signal and the current feedback signal to cause the emergency output power supplied to the load to have a programmed power output profile during the emergency state, wherein the programmed power output profile is a function of at least the temperature signal;

wherein the programmable control device is further configured to activate, if there is no power to the load as indicated by the voltage feedback signal and/or the current feedback signal, a self-test emergency state in response to a manual or preprogrammed request for a self-test, wherein the preprogrammed request for a self-test is made pursuant to a predetermined self-test schedule; and wherein the programmable control device is further configured to monitor one or more operating parameters of the emergency lighting ballast, and to create an alert if at least one of the one or more operating parameters falls outside a predetermined range.

9. The lighting fixture of claim 8, further comprising a signal output, the signal output configured to communicate the alert to a user or to a building management system.

10. The lighting fixture of claim 8, wherein the programmable control device is further configured to delay the self-test emergency state for at least one predetermined period of time if at least one of the voltage feedback signal or the current feedback signal indicates there is power to the load at the time of the request.

11. The lighting fixture of claim 10, wherein the programmable control device is further configured to activate the self-test emergency state after the at least one predetermined period of time, even if there is power to the load.

12. The lighting fixture of claim 8, further comprising a wireless communications module, the wireless communications module configured to communicate the alert to a user.

13. A method for controlling emergency power supplied to a load (20) by an emergency ballast, the method comprising:

monitoring in real time a voltage across the load and in response thereto producing a voltage feedback signal;

monitoring in real time a current through the load and in response thereto producing a current feedback signal;

measuring in real time a temperature of the ballast and in response thereto producing a temperature signal;

controlling a power translation circuit in response to at least one of the voltage feedback signal or the current feedback signal to cause an emergency output power supplied to the load from an emergency power source to have a programmed power output profile during an emergency state, wherein the programmed power output profile is a function of at least the temperature signal;

activating a self-test emergency state in response to a manual or preprogrammed request for a self-test, only if there is no power to the load as indicated by at least one of the voltage feedback signal or the current feedback signal, wherein the preprogrammed request for a self-test is made pursuant to a predetermined self-test schedule;

monitoring one or more operating parameters of the emergency ballast during the emergency state; and creating an alert if at least one of the one or more operating parameters falls outside a predetermined range.

14. The method of claim 13, further comprising the step of delaying the self-test emergency state for at least one predetermined period of time if at least one of the voltage feedback signal or the current feedback signal indicates there is power to the load at the time of the request.

15. The method of claim 13, further comprising the step of activating the self-test emergency state after the at least one predetermined period of time, even if there is power to the load.

* * * * *